United States Patent [19]

Haupt et al.

[11] Patent Number: 5,679,197
[45] Date of Patent: Oct. 21, 1997

[54] METHOD FOR BONDING A COVER FABRIC TO A CUSHION BODY USING A PRESSURIZED ENVIRONMENT

[75] Inventors: Gregory A. Haupt, New Hudson; Paul E. Koenig, Brighton; Annette H. Holbrook, Plymouth; David H. Eggleston, Pickney, all of Mich.

[73] Assignee: Hoover Universal, Inc., Plymount, Mich.

[21] Appl. No.: 508,192

[22] Filed: Jul. 27, 1995

[51] Int. Cl.$^6$ .............................. B32B 31/20; B68G 7/05
[52] U.S. Cl. .................. 156/212; 156/214; 156/285; 156/311; 156/382; 156/497; 156/498; 297/DIG. 2
[58] Field of Search ...................... 156/497, 382, 156/221, 196, 212, 214, 285, 345, 498, 311; 29/91.1, 91.5, 91.7, 91.8; 297/DIG. 1, DIG. 2

[56] References Cited

U.S. PATENT DOCUMENTS

| | | | |
|---|---|---|---|
| 2,803,577 | 8/1957 | Colt et al. | 156/497 X |
| 3,446,685 | 5/1969 | Goldstone et al. | 156/285 X |
| 3,992,238 | 11/1976 | Johns | 156/285 X |
| 4,107,829 | 8/1978 | Urai et al. | 156/196 X |
| 4,692,199 | 9/1987 | Kozlowski et al. | 156/285 X |
| 4,718,153 | 1/1988 | Armitage et al. | |
| 4,786,351 | 11/1988 | Elliot et al. | |
| 4,795,517 | 1/1989 | Elliot et al. | |
| 4,874,448 | 10/1989 | Urai | 156/196 |
| 4,975,135 | 12/1990 | Lowe | 156/285 X |
| 5,000,805 | 3/1991 | Lowe | 156/285 X |
| 5,254,197 | 10/1993 | Klems | 156/285 X |
| 5,338,386 | 8/1994 | Frelich et al. | 156/497 X |
| 5,372,667 | 12/1994 | Miyota et al. | 156/497 X |
| 5,372,668 | 12/1994 | Bracesco | 156/285 X |
| 5,492,662 | 2/1996 | Kargol et al. | 297/DIG. 2 X |

FOREIGN PATENT DOCUMENTS

| | | | |
|---|---|---|---|
| 0550954 | 7/1993 | European Pat. Off. | 29/91.1 |
| 4359979 | 12/1992 | Japan | 156/196 |
| 5-25438 | 2/1993 | Japan | 156/221 |
| 6-15069 | 1/1994 | Japan | 29/91.1 |

OTHER PUBLICATIONS

English translation of Japanese patent application 6–15069 cited above.

*Primary Examiner*—Adrienne C. Johnstone
*Attorney, Agent, or Firm*—Harness, Dickey & Pierce, P.L.C.

[57] ABSTRACT

A method for bonding a cover fabric to a cushion body to form a seating component, preferably a seat cushion of a vehicle seat assembly, includes the step of supplying a heated atmosphere, preferably steam under pressure, to a forming tool of a forming apparatus, the forming tool diffusing the heated atmosphere and passing the heated atmosphere out of the tool, through the cover fabric, and into the cushion body to melt an adhesive layer between the cushion body and the cover fabric, while the cushion body and cover fabric are subjected to a pressurized environment, preferably by locating the forming apparatus, the cover fabric, and the cushion body in a pressure chamber maintained at relatively high pressure.

6 Claims, 2 Drawing Sheets

METHOD FOR BONDING A COVER FABRIC TO A CUSHION BODY USING A PRESSURIZED ENVIRONMENT

BACKGROUND OF THE INVENTION

This invention relates to seat assemblies, and more particularly, to a method for bonding a cover fabric to a cushion body, wherein the bonding process is carried out in a pressurized environment.

Fabric-to-foam bonding processes are well known and commonly are used in forming seat cushions for vehicle seats. For example, in U.S. Pat. No. 4,786,351 which was issued to George M. Elliot et al., there is disclosed a process for forming seat cushions for vehicle seats wherein forming tools are used to compress a foam body and a cover fabric under conditions of heat and pressure, for shaping the foam body and the cover fabric while the cover fabric is bonded to the foam body. The system uses complementary upper and lower forming tools made of cast aluminum or some other material having a high thermal conductivity. The cover fabric is bonded to the foam by a hot melt adhesive. In the disclosed embodiment, the adhesive softens at a temperature in the range of 220° F. to 240° F., and typically 230° F. The process must be carried out at a high temperature because the foam is shaped simultaneously with the lamination of the fabric to the foam. Thus, the temperature of the steam being used to create the heated atmosphere must be high enough to heat the foam to a temperature at which it can be shaped.

Therefore, the process uses superheated steam which is supplied to the steam chamber of the forming tool at a temperature of about 360° F. and at a pressure of 80 pounds per square inch gauge (psig), measured at the entrance to the steam chamber of the forming tool and before the superheated steam contacts the surface of the forming tool. However, the steam temperature and pressure are lower in the steam chamber of the forming tool, and the pressure of the steam ejected out through the perforations of the forming tool is lower yet, and is typically on the order of 1–3 psig.

Operation at low pressure, i.e. 1–3 psig, makes the parameter tolerance very low or small. Consequently, a slight energy change can result in a large change in temperature. For example, at an operating pressure in the range of 1–3 psig, a small change in pressure can result in a decrease in the operating temperature from the 230° F. that is required to activate the adhesive, to a temperature of about 210° F., which is below the activation temperature of the adhesive. Under such circumstances, the quality of the fabric-to-foam bond would be affected, producing an unacceptable product. Consequently, pre-heating the forming surface of the forming tool is necessary to re-energize the steam to a superheated condition to insure that the adhesive activation temperature of 230° F. is reached during the relatively short duration bonding process. Typically, electric heaters are used to preheat the forming tool to a temperature of about 160° F. to 240° F.

Conventionally, fabric to foam bonding processes employ a cooling gas for cooling the fabric and setting the adhesive after the bonding process. In the process disclosed in U.S. Pat. No. 4,786,351, air is pulled through the fabric and foam composite by vacuum at an air flow rate of 750 cubic feet per minute (cfm). Although the cooling gas reduces process time, the use of a cooling gas has the undesirable side effect of cooling the forming tools which must be reheated at the start of the next bonding cycle.

SUMMARY OF THE INVENTION

The present invention provides a method for forming a seating component wherein a cover fabric in bonded to a cushion body under conditions of heat and pressure and wherein the bonding process is carried out in a pressurized environment. According to the invention, a method for bonding a cover fabric to a cushion body includes the steps of positioning a cover fabric on the forming surface of a forming tool that has a shape corresponding to a desired shape for the seating component, positioning a cushion body on the cover fabric and locating a layer of adhesive between the cushion body and the cover fabric. Pressure is applied to the cushion body and the cover fabric to press the cover fabric against the forming surface of the forming tool and the forming tool, the cushion body and the cover fabric are subjected to a pressurized environment. Then, a heated atmosphere, preferably high pressure steam, is supplied to the forming tool while the cushion body and the cover fabric are subjected to the pressurized environment, the heated atmosphere being diffused through the forming surface of the forming tool, through the cover fabric, and into the cushion body. The heated atmosphere is at a temperature sufficiently high to melt the adhesive layer between the cushion body and the cover fabric so that a composite structure is formed. The heated atmosphere is discontinued and the composite structure is cooled.

More specifically, in accordance with a preferred embodiment, the forming apparatus is located within a pressure chamber apparatus and air under pressure is introduced into the pressure chamber after the cover fabric and the cushion body have been positioned on the forming surface of the forming tool. The process for bonding the cover fabric to the cushion body is carried out in the pressure chamber at a pressure above ambient pressure. After the bonding process has been completed, the pressure within the pressure chamber is reduced to ambient pressure to allow the formed seating component to be removed from the pressure chamber. In a disclosed embodiment, the pressure in the pressure chamber is established and maintained at 35 pounds per square inch and the steam that is supplied to the forming tool is at a pressure of about 40 pounds per square inch gauge so that the differential pressure is lower than if operated in a non-pressurized environment. Any differential pressure desired can be established, so that the operating differential pressure can be selected as a function of the cover fabric that is being bonded to the cushion body.

The presence of pressurized air within the pressure chamber and thus around the seating component obviates the need for a vacuum for drawing air through the finished seating component after the bonding process to cool the seating component and set the adhesive. The air under pressure within the pressure chamber functions as a vacuum, but without the need to produce a vacuum within the forming tool and with the complications associated with plugging the orifices in the pressure plate during the vacuum stage of the process. In addition, steam jetting effects are reduced. Moreover, the pressure can be controlled to establish any desired pressure differential across the lower forming tool. A further advantage of the pressurized system is that the forming tools do not have to pass "pressure" standards. Surrounding the forming apparatus with a pressurized air environment is less expensive than creating a vacuum for drawing cooling gas through the finished product. In addition, there will be less steam jetting effects than occur in non-pressurized systems.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF A PREFERRED EMBODIMENT

Figure 3:
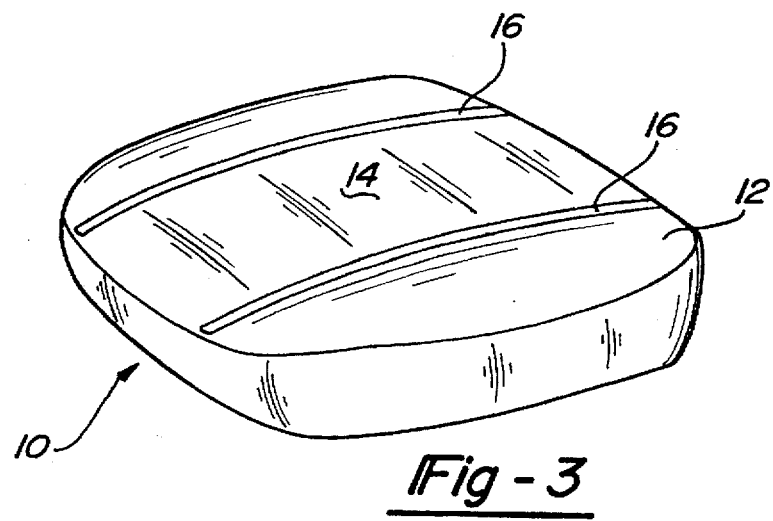
FIG. 3 is a perspective view of a seat cushion produced using the method according to the invention.

Referring first to FIG. 3, the method of the invention is described with reference to an application for producing a seating component 10, such as a seat cushion for a vehicle seat assembly, and in particular, for forming a cover fabric to a predetermined shape and bonding the cover fabric to a cushion body. The seating component can be the seat cushion portion or the seat back portion of a seat assembly, or a seat insert component. However, the method according to the invention can be used to bond a cover fabric to a cushion body of any seating component, including furniture, and the like. Moreover, the method of the invention can be used to bond one cushion body to another cushion body, such as cushion bodies that are made of foam of different densities.

The cover fabric 12 of the seating component 10, which forms a main seating surface 14 of the seating component, has grooves 16 formed therein for stylizing the appearance of the seat cushion. The main body of the seating component 10 consists of a cushion body 17, shown in FIG. 1, for example, which can be premolded or preformed to have a surface corresponding to the finished surface of the seat cushion being produced. In the exemplary embodiment, the cushion body 17 has a pair of grooves 18 in the outer surface 19 thereof, which correspond to the styling grooves 16 in the outer or occupant interfacing or "A" surface of a seat cushion (or the front surface of a seat back cushion). The cover fabric is secured to the cushion body 17 by a thermally activated adhesive 15. The cover fabric 12 and the adhesive layer 15 are not sectioned in the drawings to simplify the drawings.

The cushion body 17 can be a structure that has thermoplastic characteristics and has an outer surface 19 that is a non-solid surface. For example, such surface 19 can be a fibrous, cellular structure, or a surface that is designed or has been processed to promote mechanical bonding between a cover fabric and the surface of a cushion body. Examples of fibrous materials include Polyethylene terephthalate (PET) and rubberized hair. Examples of cellular structures include open or closed cell urethane foam. However, the method of the invention can also be used in producing other articles or seating components which require bonding a cover fabric to a cushion body. The shaping and/or bonding process is carried out under conditions of a heated atmosphere such as steam, which can be saturated or superheated or hot air provided by a source 25 of saturated steam. A form of steam is preferred due to its thermal transfer characteristics. By way of example, the saturated steam is at a pressure in the range of 3 pounds per square inch to about 60 pounds per square inch gauge at the inlet side of said the perforations.

The softening temperature of the exemplary adhesive is in the range of 210° F. to 240° F., and preferably is about 230° F. The adhesive used is selected as a function of different operating conditions used in the bonding process. In the exemplary embodiment, the adhesive 15 is a lay-on web, such as a polyamide polymer adhesive sold under the trade name POLYMID 5200 SERIES which is commercially available from Bostik. However, the adhesive can be applied to the cover fabric in any suitable form. For example, the adhesive can be sprayed onto the back surface of the cover fabric, the adhesive can be sprayed onto the cushion body or the adhesive can be pre-laminated onto the cover fabric.

Figure 1:
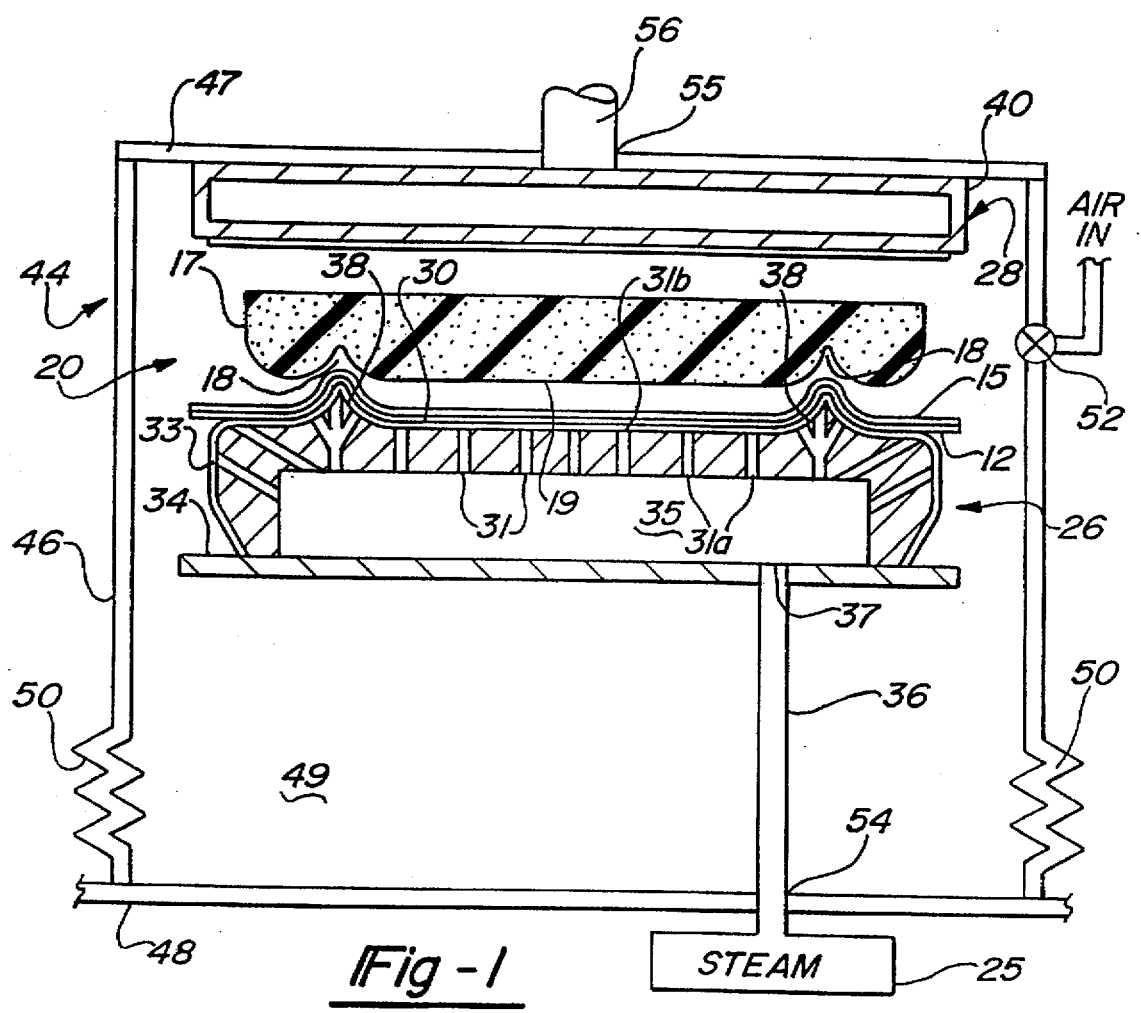
FIG. 1 is a cross-section view of forming apparatus for bonding a cover fabric to a cushion body for producing a seat cushion, and illustrating the raw materials for forming the seat cushion in their unaltered state with the cover fabric positioned on the forming tool and the cushion body being positioned above the forming tool.
Figure 2:
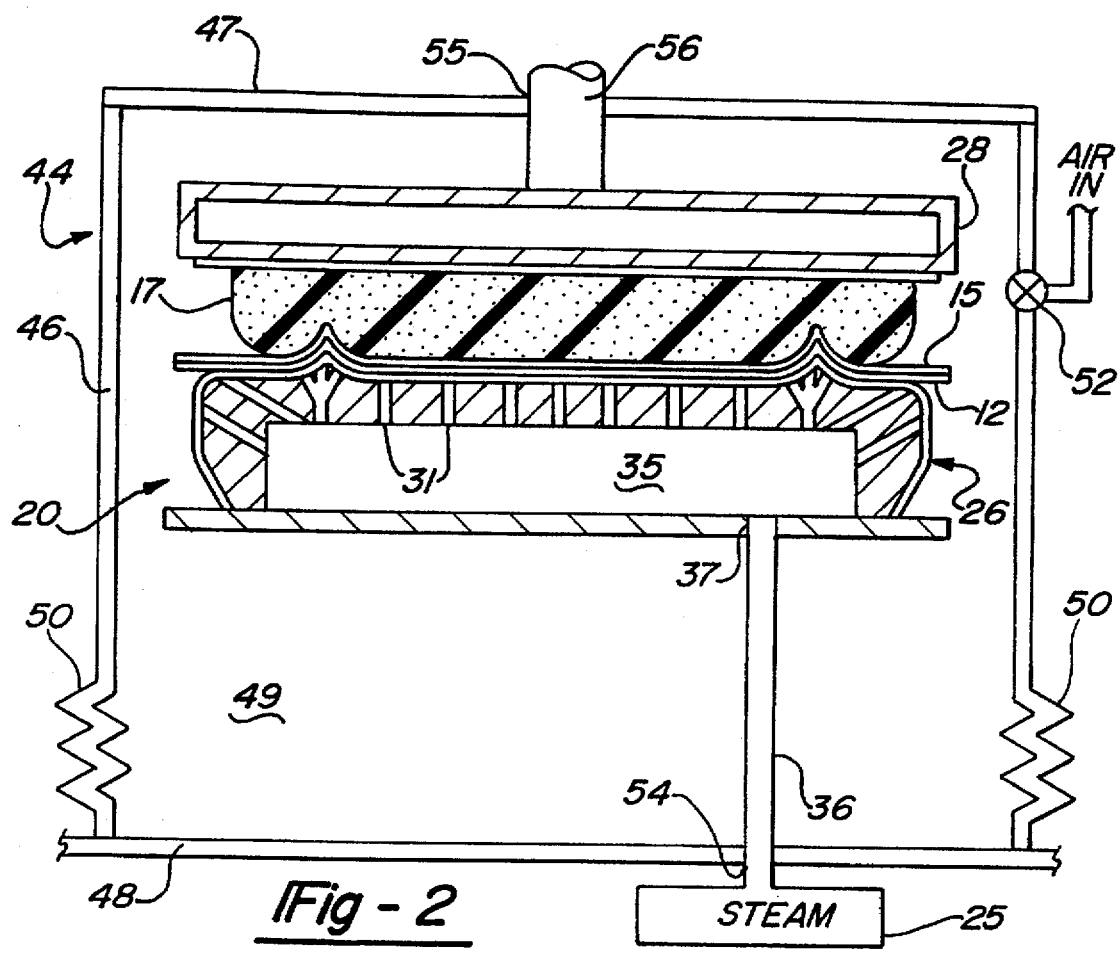
FIG. 2 is a view similar to FIG. 1 and showing the forming tool closed during compressing the seat component materials during application of saturated steam.

Referring to FIGS. 1 and 2, the forming apparatus 20 includes a lower forming tool 26 and an upper tool 28 which cooperate to compress the cover fabric 12 and the cushion body 17 while simultaneously shaping the cover fabric during bonding of the cover fabric to the cushion body. The lower forming tool 26 includes a shell member 33 mounted on a tool plate 34 in the conventional manner. The tool plate 34 closes the bottom of the shell member defining a steam chamber or tool box chamber 35 within the lower forming tool. The shell member 33 is made of cast aluminum and the upper portion of the shell member defines the contact or forming surface 30 for the forming apparatus. Shell member 33 acts as a forming surface defining member and has an outer surface, a portion of which defines forming surface 30, and an inner surface which defines an inner wall of the interior chamber (also referred to as tool box chamber 35). The lower forming tool has an inlet member 36 that is adapted to be connected to the outlet of a source of superheated steam under pressure. A regulating valve (not shown) can be interposed between the inlet member and the source of steam for controlling and regulating the pressure of the steam being supplied to the steam chamber.

The forming surface 30 includes style line forming portions 38 as is known in the art. The forming surface 30 includes perforations over substantially the entire extent thereof, including the style line portions, through which superheated steam under pressure is supplied to the cover fabric and cushion body. Each perforation 31 has an inlet side 31a and an outlet side 31b. In the exemplary embodiment, the perforations 31 are of standard size and, for example, can have a diameter in the range of approximately 0.035 to 0.065 inch and be spaced apart on 0.375 inch centers. The thickness of the forming surface, and thus the length of the perforations, is about ⅝ inch. However, the size and disposition of the perforations can vary as a function of material of the forming tool and application.

The upper tool 28 includes a structure 40 that is generally complementary in shape to the cushion pad and can be made of aluminum or an insulating material, such as epoxy. The upper tool 28 is adapted to be lowered down by a suitable press (not shown) for applying pressure to the cushion body and the cover fabric, compressing the cushion body and cover fabric between the upper and lower tools to press the cover fabric against the forming surface 30 during the bonding process. The upper tool can have a forming surface including perforations corresponding to those in the lower forming tool 26, and which forming surface is complementary to the forming surface 30 of the lower forming tool 26, depending upon the application and the product being made.

In accordance with the invention, the forming apparatus 20 is operated in a pressurized environment during the bonding process. To this end, the forming apparatus 20 and the raw materials, including the cover fabric 12 and cushion body 17, for the cushion or seating component being made, are transferred to a pressure chamber apparatus 44 that is adapted to be sealed and pressurized. The pressure chamber apparatus 44 includes a pressure skirt 46 that extends around the forming apparatus 20 on all four sides and is enclosed by a top member 47 and a bottom member 48 defining a closed pressure chamber 49 for containing the forming apparatus 20. The pressure skirt includes a flexible lower sidewall 50. An air inlet valve 52 is provided in one of the sides of the pressure skirt to permit pressurized air to be introduced into the interior of the pressure chamber for creating a selected pressure in the interior of the pressure chamber. While air is supplied under pressure to the pressure chamber 49 in this embodiment, the inventive method can also use other types of gases to pressurize pressure chamber 49. Suitable openings 54 and 55 are provided for the inlet member 36 and for the drop mechanism 56 for the upper tool 28, the openings including suitable pressure seals. The pressure chamber apparatus 44 has a suitable access door or the like (not shown) to permit access to the interior of the pressure chamber to permit fabric and cushion body to be placed on the forming tool and for the formed cushion to be removed when the laminating process is complete and to permit changing of the forming tools when necessary. Alternatively, the lower forming tool 26 can be adapted for movement into and out of the pressure chamber for processing, to facilitate the placement of the components of seating element on the forming tool and the removal of the formed seating component from the tool. Such arrangement includes means for indexing the lower forming tool with the upper tool within the pressure chamber for processing.

The method of carrying out this invention using the forming tool assembly is illustrated in FIGS. 1 and 2. A cover fabric 12 is placed the forming surface 30 of the forming tool, with its outer or "A" surface engaging the forming surface and with its back surface facing upwardly as shown in FIG. 1. The cover fabric 12 is clamped to the support by suitable fixtures (not shown) in the manner known in the art. A layer of adhesive 15 in sheet form is placed on the back surface of the cover fabric 12.

The pressure skirt 46 is sealed and the upper tool 28 is lowered down by a suitable press (not shown) to engage the cushion body 17. The upper tool 28 applies a pressure to the cover fabric 12 and the cushion body 17, compressing the elements of the seat cushion between the upper and lower tools as is shown in FIG. 2 to press the cover fabric against the forming surface 30.

Then, air under pressure is introduced into the pressure chamber 49 through the air inlet valve 52 to establish the desired pressure within the pressure chamber 49. In the exemplary embodiment, the interior of the pressure chamber is set at a pressure of 35 psig. The pressure within the pressure chamber 49 can be measured in a suitable manner such as by a pressure gauge (not shown) located within the pressure chamber 49.

When the pressure within the pressure chamber has stabilized at 35 psig, saturated steam from the steam source 25 is supplied to the tool box chamber 35 of the lower forming tool 26 while pressure is maintained by the upper tool 28. The pressure of the saturated steam, measured at the inlet 37 of the forming tool is about 80 psig. The pressure of the saturated steam at the inlet side 31a of the perforations in the tool box chamber 35 is established and maintained at a value that is about 40 psig. As a result, a diffusion pressure gradient is established through the tool box chamber 35. The forming surface is configured so that the pressure of the saturated steam exiting through the perforations is lower, on the order of 3 psig. or less. Thus, a diffusion pressure gradient also is established across the forming surface 30 of the lower forming tool 26. When pressurized steam at a pressure of 40 psig is introduced into the tool box chamber 35 of the lower forming tool during the processing operation, the net pressure on the tooling is only 5 psig because of the pressure within the pressure chamber 49 is being maintained at 35 psig. The pressure provided within the pressure chamber 49 can be controlled to establish any desired pressure differential across the lower forming tool. The temperature of the saturated steam supplied to the tool box chamber 35 is approximately 260° F. and the temperature of the saturated steam exiting through the perforations 31 is about twenty degrees lower, or about 240° F. However, this temperature is above the activating temperature of the adhesive used, which in the exemplary embodiment has an activating temperature of 230° F.

The steam introduced into the tool box chamber 35 is ejected out of the tool box chamber through the perforations 31 and passes through the cover fabric 12 and into the cushion body 17. As has been stated, the temperature of the saturated steam is sufficiently high as to activate the adhesive. Saturated steam is supplied to the tool cavity for a first interval of time which is on the order of 5 to 20 seconds. The saturated steam activates the adhesive 15 to bond the cover fabric 12 to the cushion body 17. At the end of the selected interval of time, the steam is discontinued. The upper tool 28 is raised upward or retracted to release the pressure from the cushion body and cover fabric.

When steam pressure is released, the air under pressure within the pressure chamber will flow through the cushion body and the cover fabric and out through the steam inlet, which is at low pressure in the absence of steam, providing the function of using a vacuum to draw air through the seating component for cooling the component and for setting the adhesive. When the seating component 10 thus formed has cooled, the interior of the pressure is reduced to ambient pressure, such as by venting the interior of the pressure chamber, allowing the pressure skirt to be opened to remove the seating component 10.

The presence of pressurized air within the pressure chamber and thus around the seating component eliminates the need for a vacuum for drawing air through the finished seating component after the bonding process to cool the seating component and set the adhesive. The air under pressure within the pressure chamber 49 functions as a vacuum, but without the need to produce a vacuum within the forming tool and with the complications associated with plugging the orifices in the pressure plate during the vacuum stage of the process. In addition, steam jetting effects are reduced. Moreover, the pressure can be controlled to establish any desired pressure differential across the lower forming tool.

Additional advantages of the pressurized system are that the forming tools do not have to pass "pressure" standards. Another advantage gained is temperature stability due to the 40 psig steam condensation range. Moreover, surrounding the forming apparatus with a pressurized air environment is less expensive than creating a vacuum for drawing cooling gas through the finished product. In addition, there will be less steam jetting effects than occur in non pressurized systems. Any differential pressure desired can be established, so that the operating differential pressure can be selected as a function of the cover fabric that is being bonded to the cushion body.

Those skilled in the art can now appreciate that this invention can be implemented in a variety of forms. Therefore, while this invention has been described in connection with a particular example, the true scope of the invention should not be so limited since other modifications will become apparent to the skilled practitioner upon a study of the drawings, specification and following claims.

We claim:

1. A method for bonding a cover fabric to a cushion body to form a seating component, said method comprising the steps of:

providing a forming apparatus including a forming tool having a forming surface with a shape corresponding to a desired shape for the seating component being formed;

locating said forming apparatus within a pressure chamber;

positioning the cover fabric on said forming surface of said forming tool;

positioning the cushion body on the cover fabric;

locating a layer of adhesive between the cushion body and the cover fabric;

applying pressure to the cushion body and the cover fabric thereby pressing the cover fabric against said forming surface of said forming tool;

sealing said pressure chamber;

supplying a gas under pressure to the interior of said pressure chamber thereby subjecting said forming apparatus, said cover fabric, and said cushion body to a pressurized environment;

supplying a heated atmosphere to said forming tool of said forming apparatus while said forming apparatus, said cushion body, and said cover fabric are being subjected to said pressurized environment, said heated atmosphere being at a temperature sufficiently high so that the adhesive layer between the cushion body and the cover fabric is activated thereby forming said bonded seating component;

discontinuing the heated atmosphere; and cooling the seating component.

2. The method according to claim 1, wherein said heated atmosphere is steam supplied through perforations in said forming surface, said perforations each having an inlet side and an outlet side, at a pressure in the range of 3 pounds per square inch to about 60 pounds per square inch gauge at the inlet side of said perforations.

3. The method according to claim 2, wherein the pressure of said steam is about 40 pounds per square inch gauge at the inlet side of said perforations and the pressure of said gas in said pressure chamber is 35 pounds per square inch gauge, whereby a differential pressure of 5 pounds per square inch gauge is established between the interior of said forming tool and the interior of said pressure chamber.

4. The method according to claim 2, wherein said gas is air.

5. The method according to claim 1, wherein said seating component is a seat cushion of a vehicle seat assembly.

6. A method for bonding a cover fabric to a cushion body to form a seating component, said method comprising the steps of:

positioning the cover fabric on an outer surface of a forming surface defining member of a forming tool, said outer surface having a shape corresponding to a desired shape for the seating component being formed, said forming surface defining member having an inner surface defining a wall of an interior chamber of said forming tool, said outer surface being in fluid communication with said interior chamber of said forming tool;

positioning a cushion body on the cover fabric;

locating a layer of adhesive between the cushion body and the cover fabric;

locating said forming tool, said cover fabric and said cushion body within a pressure chamber;

sealing said pressure chamber;

supplying a gas under pressure to the interior of said pressure chamber thereby subjecting said forming tool, said cover fabric and said cushion body to a pressurized environment;

applying pressure to the cushion body and the cover fabric thereby pressing the cover fabric against said outer surface;

supplying to said interior chamber of said forming tool a heated atmosphere under pressure while said forming tool, said cover fabric and said cushion body are being subjected to said pressurized environment;

maintaining said heated atmosphere at a pressure in the range of 3 to 60 pounds per square inch gauge at said inner surface of said forming surface defining member;

diffusing said heated atmosphere through said forming surface defining member and passing said diffused heated atmosphere through the cover fabric and into the cushion body, said heated atmosphere being at a temperature sufficiently high so that the layer of adhesive between the cushion body and the cover fabric is activated thereby forming said bonded seating component as said heated atmosphere is passed through the cover fabric and into the cushion body;

discontinuing said heated atmosphere at the end of an interval of time; and cooling said seating component.

* * * * *